Patented June 17, 1941

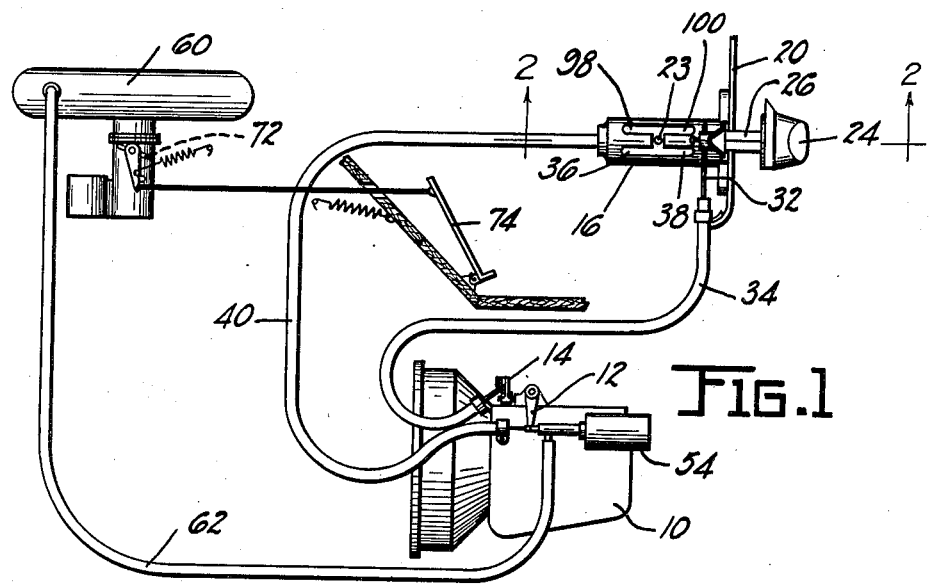
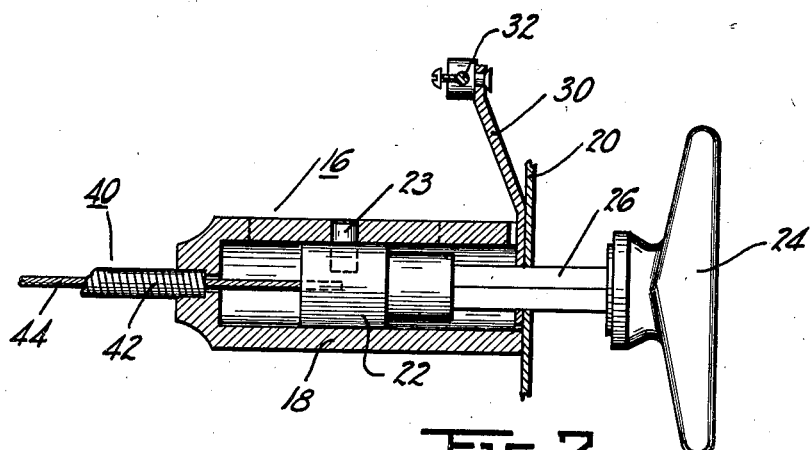
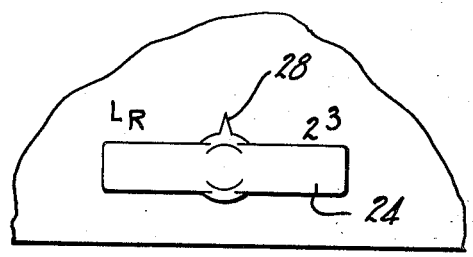

2,245,714

UNITED STATES PATENT OFFICE 2,245,714

TRANSMISSION CONTROL MECHANISM

Harold W. Price and Earl R. Price, South Bend, Ind., assignors to Bendix Products Corporation, South Bend, Ind., a corporation of Indiana Application February 9, 1939, Serial No. 255,378

1 Claim. (Cl. 74—473)

This invention relates in general to transmission operating means and in particular to means for operating the conventional three-speeds forward and reverse transmission of an automotive vehicle.

It is desirable, in the modern automotive vehicle, to clear the driver's compartment of all unnecessary controls, such, for example, as the conventional transmission operating shift lever. Accordingly, an object of the invention is to provide a power means for operating the conventional transmission, the only manually operated control member of the power means constituting a hand operated knob, which may be conveniently mounted in the dash of the vehicle adjacent the driver's seat.

The principal object of the invention, however, is to provide a simple and compact manually operated control or so-called selector for a transmission operating means, which control is mounted in the driver's compartment, for example, on the dashboard, within easy reach of the driver.

Yet another object of the invention is to provide a selector, the operation of which closely simulates the operation of a gear shift lever extending from the floorboard of the driver's compartment. In operating the transmission, such a lever is moved in a plurality of planes.

The invention further contemplates the provision of a selector so constructed that it serves as a means for operating two separate force transmitting means. Such a selector may operate a force transmitting means interconnecting the selector with that part of the transmission operable to select a shift rail to be operated and another force transmitting means interconnecting the selector, the power element of a pressure differential operated motor, the control valve of said motor and that part of the transmission for operating the selected shift rail to establish the transmission in gear.

Other objects of the invention and desirable details of construction and combinations of parts will become apparent from the following description of a preferred embodiment, which description is taken in conjunction with the accompanying drawings, in which:

Figure 1 is a diagrammatic view of the transmission operating mechanism including the manually operated selector constituting our invention;

Figure 2 is a sectional view of the selector mechanism, taken on the line 2—2 of Figure 1;

Figure 3 is a front view of the manually operated selector constituting our invention.

Figure 4:
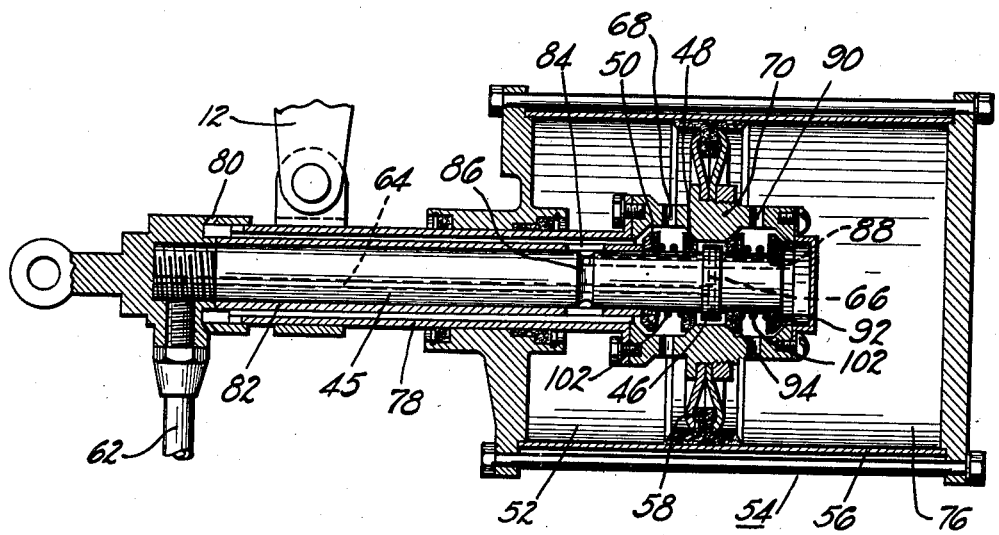
Figure 4 is a longitudinal sectional view of a pressure differential operated motor adapted to operate one or the other of the shift rails of the transmission, the control valve of which is operated by the selector constituting our invention.

Referring now to Figure 1, the numeral 10 indicates a standard three-speeds forward and reverse transmission of conventional design. The first and reverse gear shift rail of the transmission and its juxtaposed high and second gear shift rail are selectively operated by means connected to a crank 12. To another crank 14 there is connected means operative to select the rail to be actuated. The rail selecting machanism and the actuating mechanism connected to cranks 12 and 14 are not disclosed herein, inasmuch as they constitute no part of the invention disclosed in this application.

Our invention lies in a selector for operating the crank 14, which actuates the rail selecting means, and for operating means, to be described hereinafter, to rotate the crank 12 and thereby place the transmission in gear. As disclosed in Figure 1 and shown in detail in Figure 2, there is provided a selector 16, comprising a tubular housing member 18 adjustably secured to the engine side of the dashboard 20. The selector may, however, be mounted elsewhere in the driver's compartment within easy reach of the driver. From a tubular plunger 22, slidably mounted within the member 18, there projects a pin 23 adapted to fit within an H-shaped slot in said member. The plunger 22 is rotated by means of a hand operated knob 24 secured to the plunger by means of a rectangular-shaped shaft 26. Upon rotating the knob counterclockwise so that a pointer 28 thereon is moved to the first and reverse gear position indicated by the letters L and R, Figure 3, a crank 30, Figure 2, serves to move a cable 32 of a Bowden control 34 to rotate the crank 14 and to so operate the rail selecting mechanism as to make possible an actuation of the low and reverse shift rail. It follows that clockwise rotation of the knob 24 serves to actuate the crank 14 to select the second and high gear shift rail preparatory to establishing the transmission either in second or in high gear. As is disclosed in Figure 2, the crank 30 is slidably mounted upon the shaft 26 so that the plunger 22 may be reciprocated within the housing 18; and said crank is non-rotatably mounted upon said shaft in order to effect the operation of the cable 32 when the knob 24 is rotated.

Describing now the mechanism for rotating the crank 12 to shift the gears, having selected a shift rail to be moved, the knob 24 is either pushed in or pulled out to slide the pin 23 within one or the other of channels 36 and 38 of the H slot in the member 18. Describing the low gear shift, movement of the knob toward the driver serves, through the intermediary of a Bowden control 40 comprising a conduit 42 and a cable 44, to move a plunger 45 to the left, Figure 4, and, by means of a projection 46, to unseat a spring loaded valve member 48 and seat a valve member 50. The left compartment 52 of a double-ended air-suspended pressure differential operated motor 54, including a cylinder 56 and a piston 58, is consequently evacuated by virtue of a connection with the intake manifold 60 of the vehicle via a conduit 62, a duct 64 in the plunger 45, a duct 66 in the projection 46 and a port 68 in the hub 70 of the piston.

As is well known in this art, when the throttle 72 is closed by release of an accelerator 74, the engine pistons function to partially evacuate the manifold, thus providing a source of vacuum to energize the transmission operating motor 54. When the left compartment 52 of the motor is being evacuated, as above described, the air within the right compartment 76 of the motor, at atmospheric pressure, creates a pressure differential to move the piston 58 to the left and to move the low and reverse shift rail, said rail and piston being interconnected by means of a hollow connecting rod 78, the crank 14 and the aforementioned rail operating mechanism within the casing of the transmission. The transmission is thus established in low gear.

As is disclosed in Figure 4, compartments 52 and 76 are normally vented to the atmosphere via a port 80, the space between the hollow connecting rod 78 and a sleeve 82, the port 68 in the hub 70 of the piston 58, a port 84 in the sleeve 82, an annular groove 86 in the plunger 45, a duct 88 in said plunger, and a port 90 in the hub 70. Valvular members 50 and 92 are normally unseated, that is, as disclosed in Figure 4, they do not abut the hub 70 when the transmission is in neutral and the piston is in its intermediate position. It will be noted that should the knob 24 be held momentarily in a partially extended position during the operation of placing the transmission in low gear, the hub 70 of the piston will move to the left under the load of the atmosphere to again seat the valve 48. This action constitutes what is known in the art as a follow-up valve action.

The above-described valve cracking operation may, of course, be repeated until the transmission is completely meshed in low gear.

Pushing the knob toward the dash serves to establish the transmission in reverse gear, assuming that the knob has been rotated to place the pin 23 in the channel 36. In this operation, a spring loaded valve 94 is unseated and the spring loaded valve member 92 is seated, resulting in the right compartment 76 of the motor being evacuated. As will be obvious from an inspection of Figure 4 and from the previous description, the compartment 52 is at the time vented to atmosphere, resulting in the piston 58 being subject to a differential of pressure to move the same to the right and thereby establish the transmission in reverse gear. The follow-up action of the valve mechanism is the same as previously described.

It will be obvious that the above-described operation of the motor and its valve mechanism will be duplicated in placing the transmission either in second or in high gear, when the knob is rotated to place the pin 23 in either of the channels 98 and 100. A repetition of the description of the motor operation is accordingly believed to be unnecessary.

It will be noted that in the event of the failure of the power means the transmission may be operated solely by the physical effort of the driver: furthermore, with the above-described mechanism, the transmission may be operated concurrently by the power means and by the physical effort of the driver. Describing this action, when the valve members 48, 50, 92 and 94 and adjacent springs 102 and 104 go solid with the projection 46 and hub 70, there is provided means for moving the rod 78 to the left or right to place the transmission in gear by the physical effort of the driver. For example, in placing the transmission either in low gear or in high gear, the cable 44 within the conduit 42, plunger 45, projection 46, valve members 48 and 50 and spring member 102 become a solid connection, cooperating with the hub 70, connecting rod 78 and crank 12, to actuate the transmission by the physical effort of the driver. If at the time the compartment 52 is partially evacuated, then this physical effort is supplemented by the load from the motor.

There is thus provided a manually operable selector for first selecting the gear shift rail of the transmission to be operated and then effecting the operation of the rail to establish the gear setting, either by power or by the physical effort of the driver, or by both.

The selector constituting our invention is well suited as a part of the mechanism for operating the valve of a transmission operating motor such as that disclosed herein: however, the selector also may be employed as part of the transmission operating force transmitting means, which does not include a power means.

The invention heretofore described is disclosed in our Patent No. 2,152,914, dated April 4, 1939, this application constituting a division thereof.

While one illustrative embodiment has been described, it is not our intention to limit the scope of the invention to that particular embodiment, or otherwise than by the terms of the appended claim.

We claim:

In an automotive vehicle provided with a change-speed transmission comprising a plurality of spaced shifter bars, and further comprising means for selecting a bar to be moved and means for moving the selected bar to establish the transmission in gear, means for actuating both the rail selecting means and the rail operating means including a selector unit mounted within reach of the driver, said unit consisting of a housing member provided with a plurality of parallel guide slots therein extending lengthwise thereof and a slot interconnecting said slots, a plunger member mounted within the housing member, said plunger member being provided with a pin projecting therefrom and movable within said slots, means consisting of a manually operable knob and a shaft interconnecting said knob and plunger for rotating and bodily moving said plunger to thereby move said pin in said guide slots, a crank non-rotatably and slidably mounted upon the shaft, force transmitting means interconnecting the crank with that part of the transmission operating means operable to select a shift rail to be actuated, and other force transmitting means interconnecting the plunger with that part of the transmission operating means operable to move the selected rail to place the transmission in gear.

HAROLD W. PRICE.
EARL R. PRICE.